A. T. BALLENTINE.
FEED BAG FOR HORSES.
No. 47,270. Patented Apr. 18, 1865.
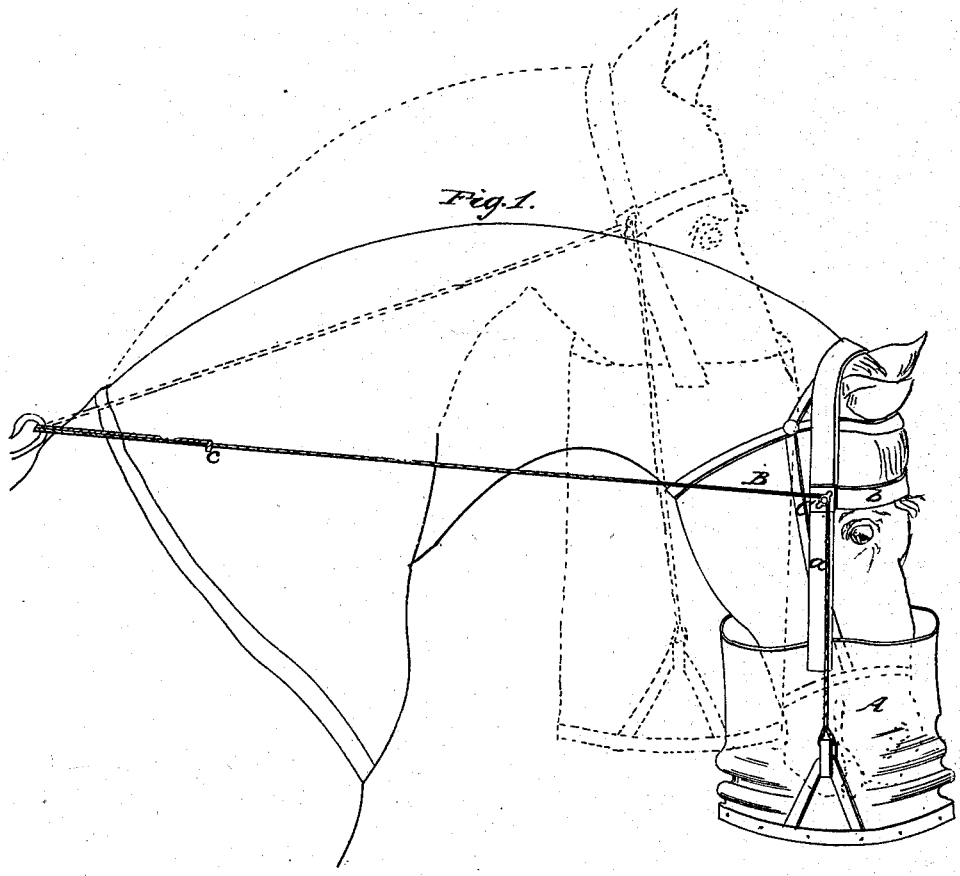
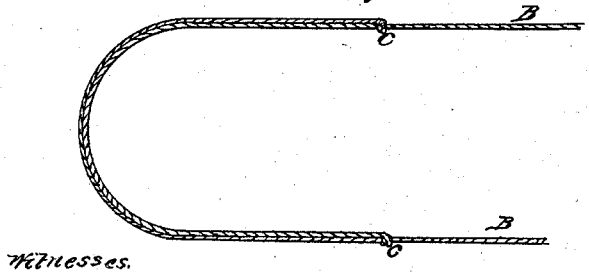
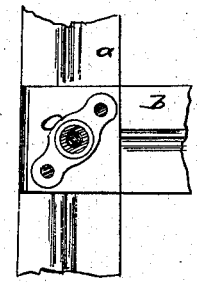

UNITED STATES PATENT OFFICE.

A. T. BALLENTINE, OF NEW YORK, N. Y.

IMPROVEMENT IN FEED-BAGS FOR HORSES.

Specification forming part of Letters Patent No. 47,270, dated April 18, 1865.

*To all whom it may concern:*

Be it known that I, A. T. BALLENTINE, of the city, county, and State of New York, have invented a new and Improved Feed-Bag for Horses; and I do hereby declare that the following is a full, clear, and exact description thereof, which will enable those skilled in the art to make and use the same, reference being had to the accompanying drawings, forming part of this specification, in which—

Figure 1 is a side view of my invention applied to a horse; Fig. 2, an enlarged side view of a portion of the trapping by which the bag is secured to or suspended upon the head of the horse; Fig. 3, a detached plan or top view of a portion of the rope or cord of the tackle by which the bag is rendered self-adjusting.

Similar letters of reference indicate corresponding parts.

This invention relates to a new and improved feed-bag, to be applied to a horse, so that the latter may eat therefrom while in harness and without the aid of any support or fixture for the bag to rest upon.

The invention is designed as an improvement on the bags now used by draymen, teamsters, &c., for giving their animals when in harness a feed of oats or other short feed or grain wherever they may chance to stop, and where there are no mangers or other fixed conveniences for feeding.

A represents a bag constructed of the usual size for such purposes, and suspended to the head of the animal by a strap, $a$, passing over the head behind the ears with a fore strap, $b$, attached, passing over the forehead. (See Fig. 1.) The bottom of the bag may be constructed of a board or have a stiff lining of any suitable material to render it rigid, and to each side of this bottom there is attached a cord or rope, B, said cords or rope, extending upward and passing through sheaves C C at each side of the strap $a$ at the junction of the fore strap, $b$, with it. The ropes or cords B B are connected by slip or sliding knots $c\ c$, as shown in Fig. 3, to admit of said ropes or cords being virtually lengthened or shortened, as may be required.

The operation is as follows: The bag is supplied with the requisite amount of feed and suspended on the head of the horse, the ropes or cords B B being placed over the check-rein hook of the harness-saddle and taken up or let out by sliding the knots $c\ c$ so as to give said ropes or cords the proper or required length. When the bag is first applied, the mouth of the horse should, when the head is erect or in a natural position, be within the feed, as shown in red dotted lines, Fig. 1, and as the latter lowers under consumption the horse will gradually lower his head, which movement, through the medium of the ropes or cords B B, serves to draw up the bottom of the bag, and consequently keep the feed within reach of the mouth of the animal until all the feed is consumed. Thus by this simple means a self-adjusting feed-bag is obtained, and one requiring no support or rest of any kind.

I am aware that feed-bags have before been suspended to a horse's head so as to be self-adjusting.

Having thus described my invention, I claim as new and desire to secure by Letters Patent—

The combination of the flexible bag A, head-stall $a\ b$, rope B, sheaves C, and adjusting-loops $c$, all as herein described, and for the purposes specified.

A. T. BALLENTINE

Witnesses:
WM. F. MCNAMARA,
M. M. LIVINGSTON.